United States Patent
Roark et al.

(10) Patent No.: US 6,226,280 B1
(45) Date of Patent: May 1, 2001

(54) ALLOCATING AND DE-ALLOCATING TRANSMISSION RESOURCES IN A LOCAL MULTIPOINT DISTRIBUTION SERVICES SYSTEM

(75) Inventors: Charles W. Roark, Plano; Michael L. Robinson, Arlington; Andrew Cilia, Grand Prairie, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/988,642

(22) Filed: Dec. 11, 1997

Related U.S. Application Data (60) Provisional application No. 60/032,823, filed on Dec. 11, 1996.

(51) Int. Cl.[7] ........................................ H04Q 7/00
(52) U.S. Cl. ............................. 370/330; 370/468
(58) Field of Search ........................ 370/330, 332, 370/464, 468, 350, 436, 347, 331, 333; 455/71, 72, 62

(56) References Cited

U.S. PATENT DOCUMENTS

| | | | |
|---|---|---|---|
| 5,249,174 | * 9/1993 | Itoh | 370/330 |
| 5,818,832 | * 10/1998 | McCallister | 370/350 |
| 5,884,148 | * 3/1999 | Bilgic | 455/74.1 |
| 5,886,989 | * 3/1999 | Evans | 370/346 |

FOREIGN PATENT DOCUMENTS

| | | |
|---|---|---|
| 0 583 233 A2 | 2/1994 | (EP) . |
| 0 647 074 A2 | 4/1995 | (EP) . |
| 0 848 562 A2 | 6/1998 | (EP) . |

* cited by examiner

*Primary Examiner*—Douglas Olms
*Assistant Examiner*—Ricardo M. Pizarro
(74) *Attorney, Agent, or Firm*—Robert L. Troike; Frederick J. Telecky, Jr.

(57) ABSTRACT

A method is provided for allocating and de-allocating transmission resources in a local multipoint distribution services system. In the method, one of an off-hook after idle signal and an incoming call request signal is detected. A frequency and a time slot for a call are assigned at a base system in response to the detection of the off-hook after idle signal or the incoming call request signal. A customer premises equipment unit is tuned to the assigned frequency in order to deliver the call.

11 Claims, 9 Drawing Sheets

ALLOCATING AND DE-ALLOCATING TRANSMISSION RESOURCES IN A LOCAL MULTIPOINT DISTRIBUTION SERVICES SYSTEM

This application claims priority under 35 USC §119(e)(1) of Provisional application No. 60/032,823 filed Dec. 11, 1996.

RELATED PATENT APPLICATIONS

This application is related to copending U.S. application Ser. No. 08/988,785, filed on by Charles W. Roark, and entitled "Single Disconnect Call Processing For Both Far End and Near End Disconnects."

TECHNICAL FIELD OF THE INVENTION

This invention relates in general to telecommunication systems, and more particularly, to allocating and de-allocating transmission resources in a local multipoint distribution services system.

BACKGROUND OF THE INVENTION

A local multipoint distribution services (LMDS) system can be used to deliver various services to one or more fixed customer sites without a wireline connection. An exemplary system is described in U.S. patent application Ser. No. 08/345,183, filed on Nov. 28, 1994, and continuation application Ser. No. 08/845,976 filed on Apr. 30, 1997 entitled "Low Power, Short Range Point-To-Multipoint Communications System," the entire disclosure of which is incorporated herein by reference. In one embodiment, an LMDS system can be coupled between a central office of a public switched telephone network (PSTN) and at least one telephone located at a customer site to provide telephony services. To deliver a telephone call between the central office and the telephone, such an LMDS system may utilize one of a number of time slots contained within one of a number of frequencies. The frequencies and time slots constitute transmission resources which may be re-used within the LMDS system. That is, a frequency and time slot could be allocated when needed to deliver a given call, and then de-allocated when the call has been completed. Prior systems for delivery of telephony services, such as classical (i.e., wireline) telephony and cellular, have not re-used both frequencies and time slots to deliver telephone calls, and accordingly, have not addressed the problem of allocating and de-allocating both of these transmission resources to support the re-use of these resources.

SUMMARY OF THE INVENTION

Accordingly, from the foregoing, there is a need for a method and system for allocating and de-allocating transmission resources in a local multipoint distribution services system.

According to an embodiment of the present invention, a method is provided for allocating and de-allocating transmission resources in a local multipoint distribution services system. In the method, one of an off-hook after idle signal and an incoming call request signal is detected. A frequency and a time slot for a call are assigned at a base system in response to the detection of either an off-hook after idle signal or an incoming call request signal. A customer premises equipment unit is tuned to the assigned frequency in order to deliver the call.

According to another embodiment of the present invention, a local multipoint distribution services system is provided. The local multipoint distribution services system includes a remote terminal, which can detect an incoming call request signal, and a customer premises equipment unit, which can detect an off-hook after idle signal. A base system is coupled to the remote terminal and the customer premises equipment unit. The base system assigns a frequency and a time slot for a call in response to either the detection of an incoming call request signal or an off-hook after idle signal. The customer premises equipment unit tunes to the assigned frequency for the call.

The present invention provides various technical advantages. For example, one technical advantage includes a protocol for allocating and de-allocating transmission resources in a local multipoint distribution services system. Other technical advantages are readily apparent to one skilled in the art from the following figures, descriptions, and claims.

BRIEF DESCRIPTION OF THE DRAWINGS

For a more complete understanding of the present invention and for advantages thereof, reference is now made to the following description taken in conjunction with the accompanying drawings, wherein like reference numerals represent like parts, in which.

DETAILED DESCRIPTION OF THE INVENTION

The present invention and its advantages are best understood by referring to FIGS. 1 through 7C of the drawings, like numerals being used for like and corresponding parts of the various drawings.

Figure 1:
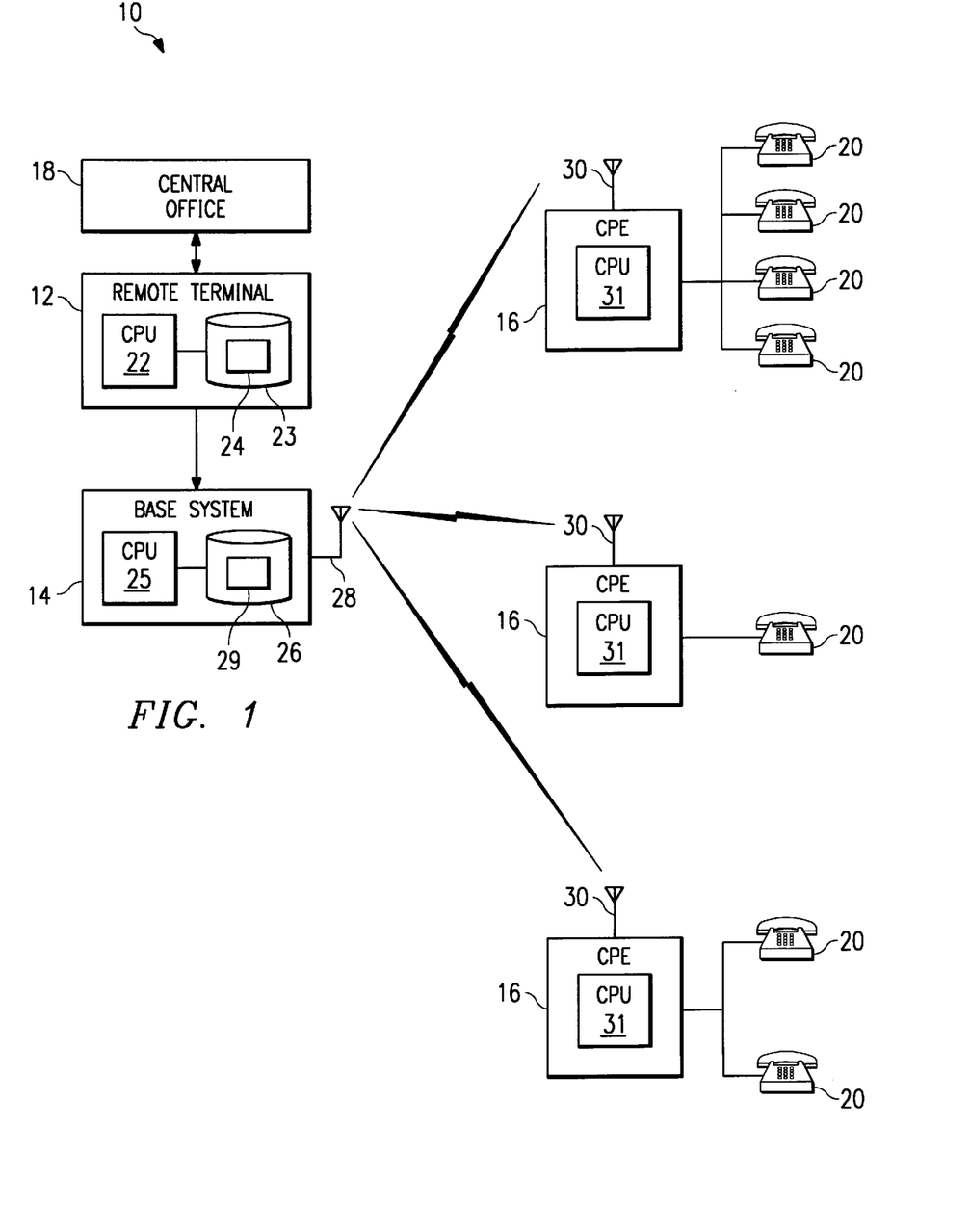
FIG. 1 illustrates a local multipoint distribution services system.

FIG. 1 illustrates a local multipoint distribution services (LMDS) system 10 of the present invention. LMDS system 10 comprises a digital loop carrier (DLC) remote terminal 12, a base system 14, and one or more customer premises equipment (CPE) units 16. Generally, in one embodiment, LMDS system 10 functions to provide or support bi-directional communication, such as voice and/or data telephony, between a central office 18 and one or more telephones 20.

In particular, LMDS system 10 can deliver telephone calls originating at a remote telephone coupled to central office 18 and directed to one of telephones 20, and also deliver telephone calls originating at one of telephones 20 and directed to a remote telephone coupled to central office 18. A remote telephone constitutes a "far end" device, whereas a telephone 20 constitutes a "near end" device. Transmission in the direction from far end to near end may be considered a "downstream" communication. Transmission from near end to far end is considered an "upstream" communication.

Within LMDS system 10, a given telephone call, corresponding to a particular Digital Signal level 0 (DS-0) signal, can be delivered over any of a number of time slots. Each time slot is contained within one of a number of frequencies. According to a time-division multiplexing (TDM) scheme, multiple time slots are multiplexed into each frequency, so that each frequency may support a Digital Signal level 1 (DS-1) signal. The frequencies and time slots constitute transmission resources which can be available for the delivery of any telephone call between central office 18 and telephones 20. The transmission resources are re-used within LMDS system 10, and thus, are "shared" between telephones 20. The present invention provides for allocation of the shared transmission resources in LMDS system 10.

Referring to FIG. 1, remote terminal 12 is coupled to central office 18. Remote terminal 12 functions to support the communication of LMDS system 10 with central office. Remote terminal 12 and central office 18 may communicate using a digital loop carrier signaling protocol. Remote terminal 12 also supports disconnect call processing for near end and far end disconnects. The same disconnect call processing is executed for both types of disconnects. As shown, remote terminal 12 may include a central processing unit (CPU) 22 coupled to a memory 23. CPU 22, which can be implemented as any processor running suitable software or an application specific integrated circuit (ASIC), performs the processing functionality of remote terminal 12. Memory 23 may reside in a suitable storage medium, such as random access memory (RAM), read-only memory (ROM), disk, tape storage, or other suitable volatile or non-volatile data storage system. Memory 23 may include a relational database. Memory 23 may temporarily store information 24. Information 24 specifies which transmission resources (i.e., frequency and time slot) have been allocated for a particular call being delivered by LMDS system 10. Information 24 may support a disconnect call processing routine.

Base system 14 is coupled to, and may communicate with, remote terminal 12. Such communication may occur over a dedicated port, such as an RS-232 craft interface port. Base system 14 generally functions to assign and de-assign transmission resources for call delivery. Base system 14 may include a central processing unit (CPU) 25, a memory 26, and a transceiver 28. Like CPU 22 of remote terminal 12, CPU 25 of base system 14 can be implemented as any suitable processor running appropriate software. CPU 25 performs the processing functionality of base system 14, including the assignment and de-assignment of transmission resources. Memory 26 is coupled to CPU 25 and may reside in a suitable storage medium, such as RAM, ROM, disk, tape storage, or other suitable volatile or non-volatile data storage system. Memory 26 may comprise a relational database. Memory 26 may contain information 28. Information 28 may specify the transmission resources currently available for the delivery of a telephone call and the transmission resources currently being used for other telephone calls.

Transceiver 28, which can be implemented as any suitable transceiver, functions to transmit and receive signals over the transmission resources. More specifically, transceiver 28 may transmit downstream at a particular frequency or range of frequencies. Such downstream frequency or range of frequencies may support a plurality of DS-1 signals. In one embodiment, twenty-four DS-1 signals may be supported by the downstream frequency or frequencies. Transceiver 28 may also receive signals over a plurality of upstream frequencies or range of frequencies. Each upstream frequency or range of frequencies, which may have smaller bandwidth than the downstream frequency or range of frequencies, may support a single DS-1 signal. Apart from the upstream and downstream frequencies supporting DS-1 signals, transceiver 28 may also utilize a common control or out of bound channel to convey overhead information, such as handshake information and on-hook signal.

Each CPE unit 16 may be installed, maintained, and/or operated at an individual customer's premises, such premises being either commercial or residential. Each CPE unit 16 may be coupled to one or more telephones 20 with a hardwire connection. The number of CPE units 16 within LMDS system 10 may be adjusted according to the needs of a particular geographical area. For example, if a large number of customers are located in a given area, additional CPE units 16 can be provided. Furthermore, the number of telephones 20 coupled to a CPE unit 16 may vary according to the needs of the customer at whose site the CPE unit 16 is located. Each CPE unit 16 is operable to receive or detect various signals, such as an on-hook signal, generated by any of the telephones 20 to which the CPE unit 16 is coupled.

As shown, each CPE unit 16 may include a transceiver 30 and a central processing unit (CPU) 31. Transceivers 30 support communication with base system 14 over the transmission resources. In particular, transceivers 30 receive signals at the downstream frequency or range of frequencies broadcast by transceiver 28 of base system 14. Furthermore, in order to deliver a particular call, each transceiver 30 may be tuned to transmit at one of the upstream frequencies or range of frequencies. Transceivers 30 may also communicate overhead (e.g., handshake) information with base system 14 utilizing the out of bound channel. The information within the out of bound channel may be passed through base system 14 directly to remote terminal 12. Each CPU 31 performs the processing functionality for the CPE unit 16 within which it is contained. Each CPU 31 may be implemented as any suitable processor.

Generally, in operation, LMDS system 10 may receive a request for call delivery from either central office 18 or one of telephones 20. In response to such request, LMDS system 10 determines which transmission resources (i.e., frequencies and time slots) are available to deliver the call. If any resources are available, LMDS system 10 allocates a particular time slot and frequency for delivery. During delivery of the call, remote terminal 12 may perform normal call processing with central office 18. System level call processing for both base system 14 and CPE units 16 is "pass through." The call can be terminated at either the near end or the far end. For near end disconnect, LMDS system 10 receives an on-hook signal from telephone 20. For a far end disconnect, LMDS system 10 receives a disconnect signal from central office 18. In response to either of the on-hook signal or the disconnect signal, LMDS system 10 may perform the same disconnect call processing routine. During disconnect call processing, the time slot and frequency (that were previously allocated) are de-allocated so that these transmission resources can be reused.

FIGS. 2 and 3A through 3C relate to the operation of LMDS system 10 as it may be used to perform processing for a call originating at one of telephones 20 coupled to a CPE unit 16. In such a case, hereinafter referred to as "local origination call processing," a customer of LMDS system 10 desires to call another party at a remote telephone coupled to central office 18.

Figure 2:
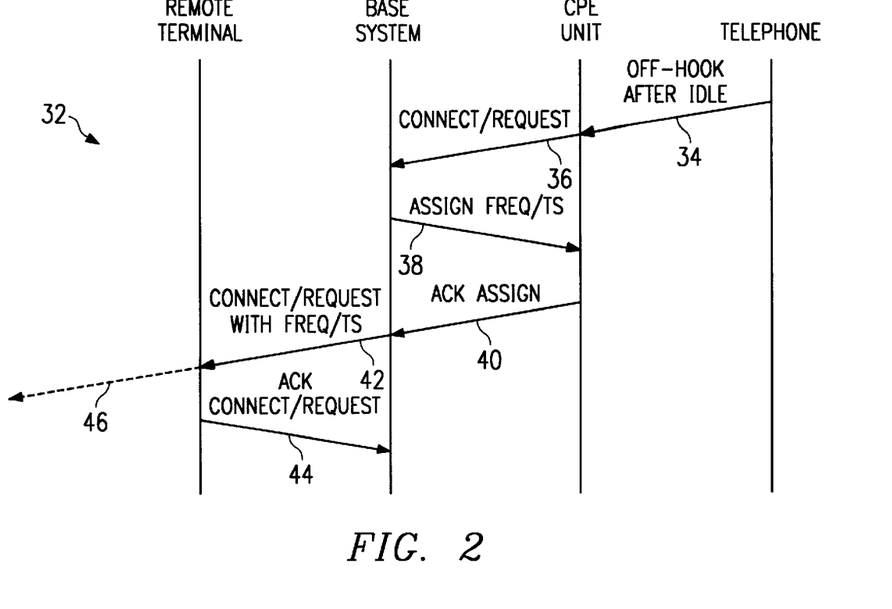
FIG. 2 is a diagram illustrating communication between elements of the local multipoint distribution services system illustrated in FIG. 1 during local origination call processing.

FIG. 2 is a diagram 32 illustrating communication among remote terminal 12, base system 14, and one of CPE units 16 during local origination call processing. Communication diagram 32 comprises a plurality of arrows 34 through 46, wherein each arrow represents transmission of a message or signal from one of the elements of LMDS system 10 to another element. The signaling and messaging represented by these arrows 34 through 46 are described in more detail with reference to FIGS. 3A through 3C.

Figure 3A:
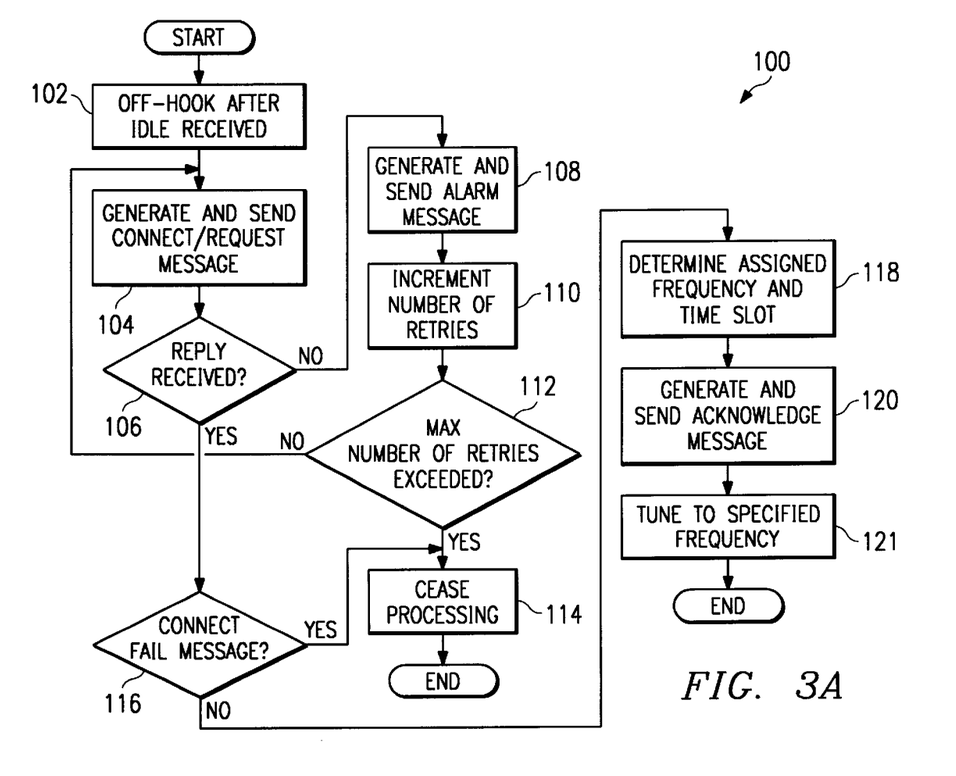
FIGS. 3A through 3C are flow diagrams of related methods for allocating transmission resources during local origination call processing.
Figure 3B:
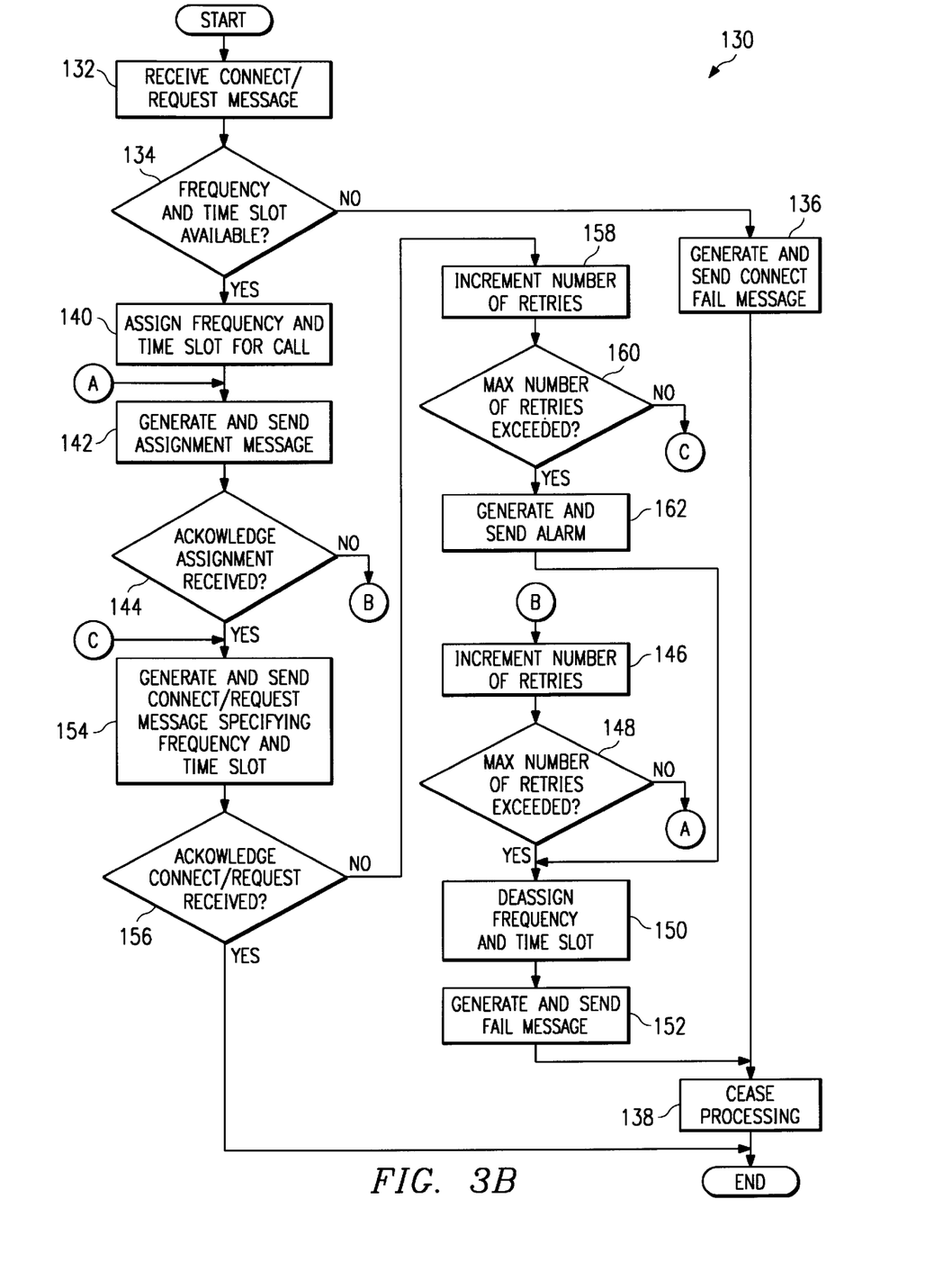
Figure 3C:
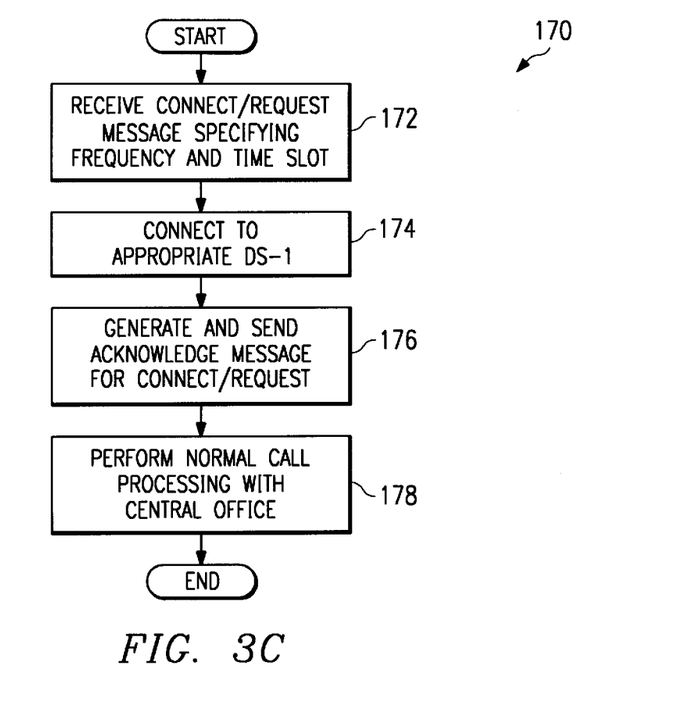

FIGS. 3A through 3C are flow diagrams of a plurality of related methods for allocating transmission resources (i.e., frequency and time slot) in LMDS system 10 during local origination call processing. FIGS. 3A, 3B, and 3C correspond to the operation of a CPE unit 16, base system 14, and remote terminal 12, respectively, during local origination call processing.

FIG. 3A is a flow diagram of a method 100 corresponding to the operation of a CPE unit 16 during local origination call processing. Method 100 begins at step 102 where a CPE unit 16 receives an off-hook after idle signal from a telephone 20 to which the CPE unit 16 is connected. An off-hook after idle signal indicates that a user, such as a customer, at telephone 20 desires to initiate a telephone call. The off-hook after idle signal can be relayed by telephone 20 to CPE unit 16, as indicated by arrow 34 in FIG. 2.

In response to the off-hook after idle signal, CPE unit 16 generates and sends a connect/request message to base system 14 at step 104. The connect/request message may be relayed over a time slot dedicated for overhead signals. The transmission of the connect/request message corresponds to arrow 36 in FIG. 2.

At step 106, CPE unit 16 determines whether a reply has been received from base system 14. This reply may either be a connect-fail message or an assignment message, as explained below. If no reply has been received, CPE unit 16 generates and sends an alarm message at step 108. The alarm message functions to alert an appropriate entity, such as a system administrator, that a problem has arisen in LMDS system 10.

At step 110, CPE unit 16 increments a number corresponding to the number of retries attempted by CPE unit 16 for the generation and transmission of a connect/request message. CPE unit 16 determines whether the maximum number of retries has been exceeded at step 112. This maximum number may be configured by a user of system 10. If the maximum number of retries has not been exceeded, CPE unit 16 returns to step 104 where it again generates and sends a connect/request message. On the other hand, if the maximum number of retries has been exceeded, CPE unit 16 ceases processing at step 114 and method 100 ends.

Referring again to step 106, if it is determined that a reply has been received from base system 14, CPE unit 16 determines whether the reply is a connect-fail message at step 116. A connect-fail message may indicate that either base system 14 or remote terminal 12 of system 10 is unable to make a connection for the call. In some cases, the connect-fail message may be generated when transmission resources, such as frequencies and/or time slot, are unavailable for communication between CPE unit 16 and base system 14. If at step 116 it is determined that the reply is a connect-fail message, CPE unit 16 ceases processing at step 114, and method 100 ends.

On the other hand, if the reply is not a connect-fail message, the message may be an assignment message, which is represented by arrow 38 in FIG. 2. An assignment message specifies the transmission resources (frequency and time slot) that have been assigned for communication between base system 14 and CPE unit 16 during the call. At step 118, CPE unit 16 determines the assigned frequency and time slot. CPE unit 16 generates and sends an acknowledge message for the assignment at step 120. At step 121, CPE unit 16 tunes to the specified frequency, thus, enabling CPE unit 16 to communicate with base system 14 for the telephone call. Method 100 then ends.

FIG. 3B is a flow diagram of a method 130 corresponding to the operation of base system 14 during local origination call processing. Method 130 begins at step 132 where base system 14 receives a connect/request message (indicated by arrow 36 in FIG. 2) from the CPE unit 16. At step 134, base system 14 determines whether a frequency and time slot are available for the telephone call. If no frequency and time slot are available, base system 14 generates and sends a connect-fail message to CPE unit 16 at step 136. At step 138, base system 14 ceases processing, and method 130 ends.

On the other hand, if it is determined at step 134 that a frequency and time slot are available, base system 14 assigns a frequency and time slot for the call at step 140. Information for the assigned frequency and timeslot can be stored in memory 26 of base system 14. At step 142, base system 14 generates and sends an assignment message to the CPE unit 16, as indicated by arrow 38 in FIG. 2. The assignment message specifies the frequency and time slot allocated by base system 14.

At step 144, base system 14 then determines whether an acknowledge assignment message (indicated by arrow 40 in FIG. 2) has been received from CPE unit 16. If no acknowledgment has been received, base system 14 increments a number corresponding to the number of retries attempted by base system 14 for the generation and transmission of an assignment message at step 146. At step 148, base system 14 determines whether the maximum number of retries has been exceeded. If not, base system 14 returns to step 142 where it generates and sends an assignment message. On the other hand, if the maximum number of retries has been exceeded, base system 14 de-assigns the frequency and time slot previously allocated for the call at step 150. At step 152, base system 14 generates and sends a fail message to CPE unit 16. Base system 14 then moves to step 138 where it ceases processing, and method 130 ends.

Referring again to step 144, if it is determined that an acknowledgment for the assignment has been received, then at step 154, base system 14 generates and sends a connect/request message to remote terminal 12. The connect/request message, indicated by arrow 42 in FIG. 2, specifies the frequency and time slot that has been assigned by base system 14. At step 156, base system 14 determines whether an acknowledgment (indicated by arrow 44 in FIG. 2) for the connect/request has been received. If so, method 130 ends.

If at step 156 it is determined that no acknowledgment for the connect/request has been received, then at step 158, base system 14 increments a number corresponding to the number of retries it has attempted for the generation and sending of a connect/request message. At step 160, base system 14 determines whether a maximum number of retries has been exceeded. If not, base system 14 returns to step 154 where it generates and sends a connect/request message to remote terminal 18. On the other hand, if the maximum number of retries has been exceeded, base system 14 generates and sends an alarm at step 162. The alarm indicates that a problem has arisen in LMDS system 10. Base system 14 then moves to step 150, where it de-assigns the previously allocated frequency and time slot.

FIG. 3C is a flow diagram of a method 170 corresponding to the operation of remote terminal 12 during local origination call processing. Method 170 begins at step 172, where remote terminal 12 receives a connect/request message (indicated by arrow 42 in FIG. 2) from base system 14. The connect/request message specifies the frequency and time slot which have been assigned by base system 14 for a telephone call. Information for the frequency and time slot may be stored as part of information 24 in memory 23 of remote terminal 12.

In response to the connect/request message, remote terminal 12 connects to a suitable DS-1 line for connecting the call to central office 18 at step 174. Information for the DS-1 line may also be stored in memory 23.

Remote terminal 18 generates and sends an acknowledge message for the connect/request at step 176. The acknowledge message is represented by arrow 44 in FIG. 2. Afterwards, at step 178, remote terminal 12 performs normal call processing so that the call originated at telephone 20 is delivered to central office 18 via LMDS system 10. Normal call processing is indicated by arrow 46 in FIG. 2.

Figure 4:
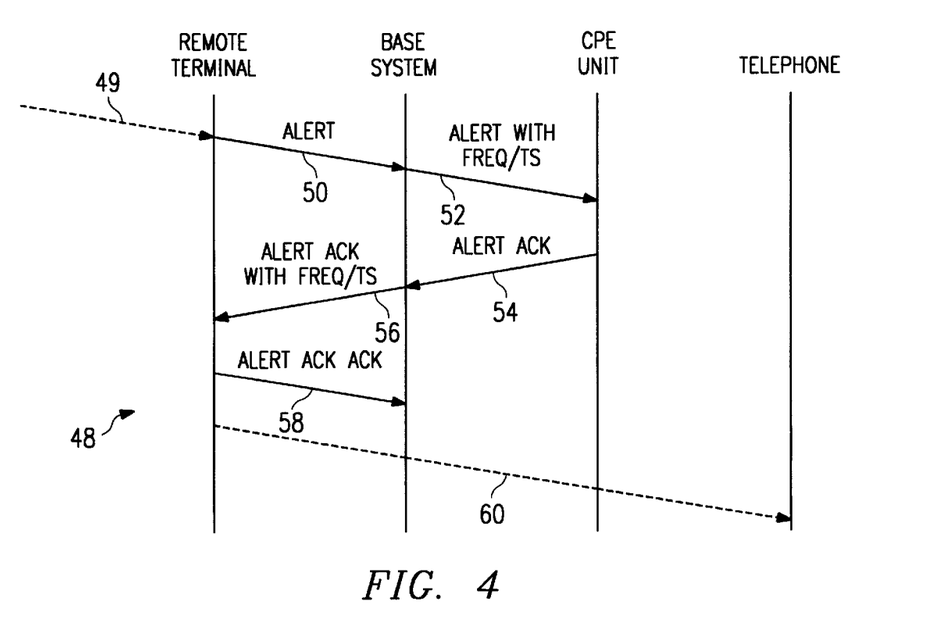
FIG. 4 is a diagram illustrating communication between various elements of the local multipoint distribution services system shown in FIG. 1 during remote origination call processing.

FIGS. 4 and 5A through 5C relate to the operation of LMDS system 10 as it may be used to deliver a call originating from a remote telephone (coupled to central office 18) to one of telephones 20. Hereinafter, this will be referred to as remote origination call processing. FIG. 4 is a diagram 48 illustrating communication among remote terminal 12, base system 14, and a CPE unit 16 during remote origination call processing. Communication diagram 48 includes a plurality of arrows 49 through 60. Each of arrows 49 through 60 represents transmission of a message or signal from one of remote terminal 12, base system 14, CPE unit 16, central office 18, and telephone 20 to another one of these devices. The messaging and signaling are described in more detail with reference to FIGS. 5A through 5C.

Figure 5A:
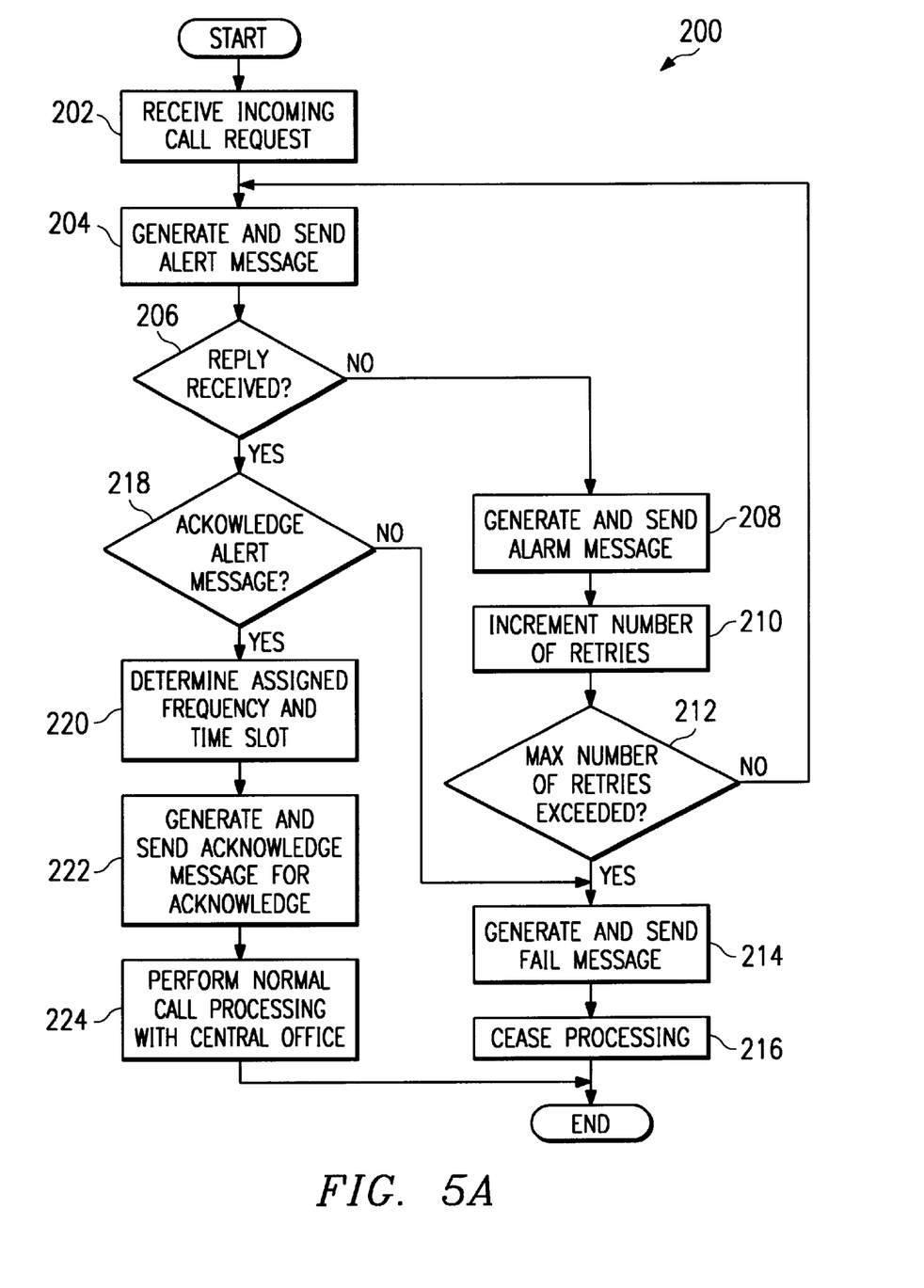
FIGS. 5A through 5C are flow diagrams of related methods for allocating transmission resources during remote origination call processing.
Figure 5B:
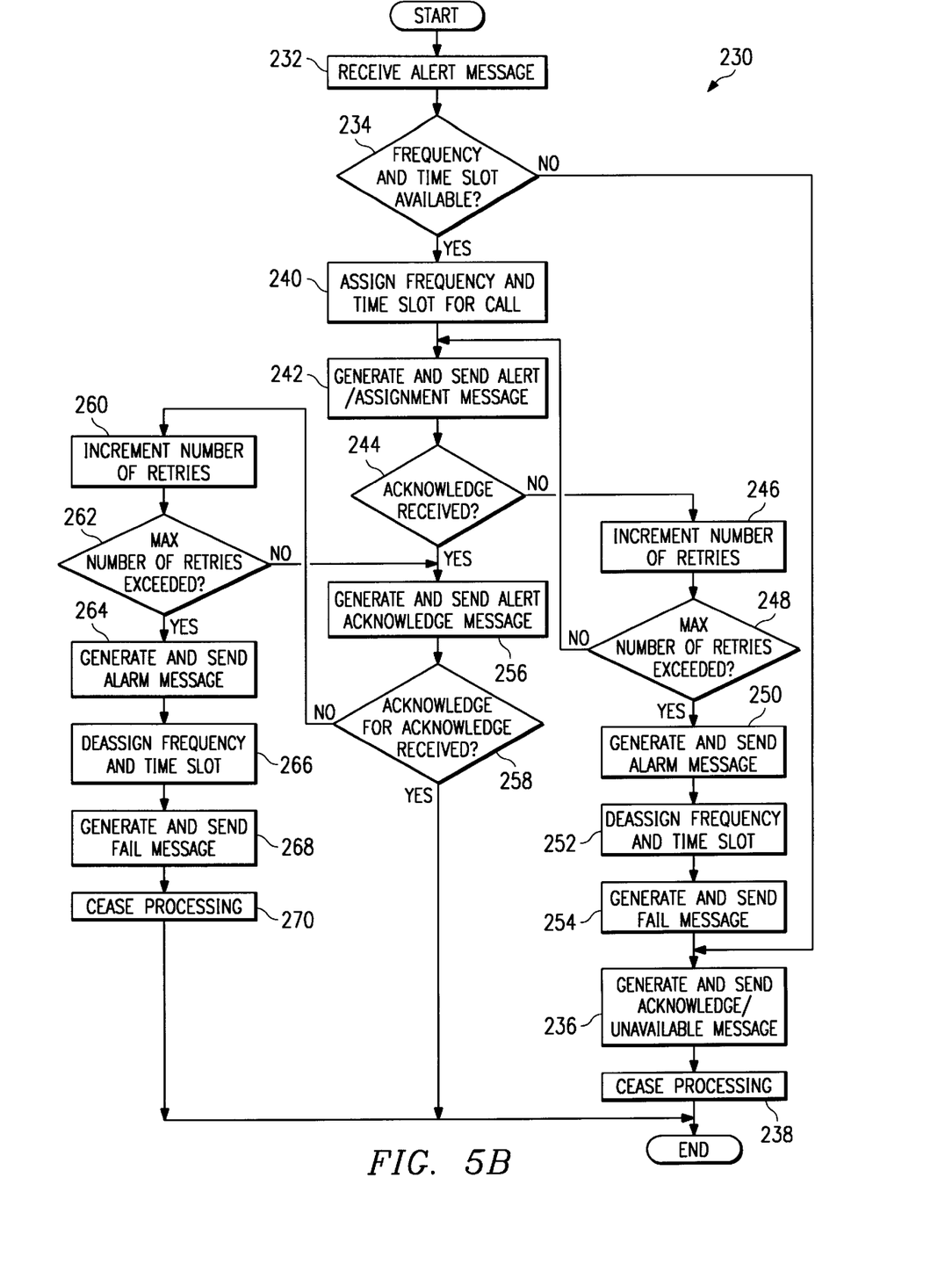
Figure 5C:
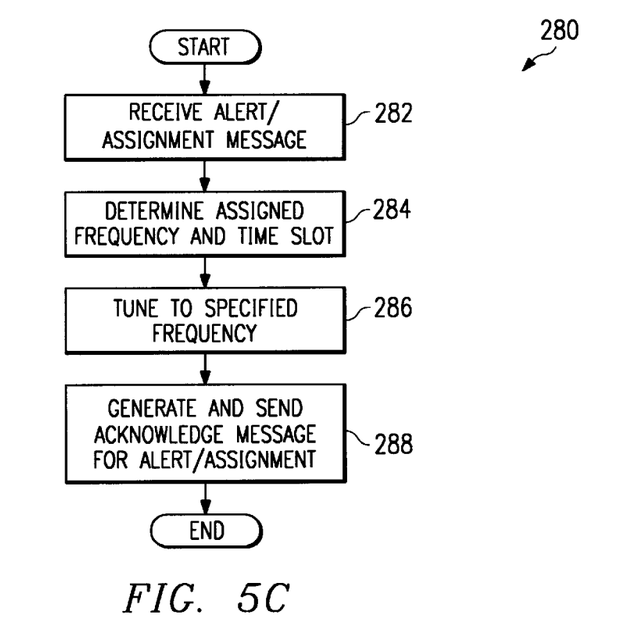

FIGS. 5A through 5C are flow diagrams of a plurality of related methods for allocating transmission resources during remote origination call processing. FIGS. 5A, 5B, and 5C correspond to the operation of remote terminal 12, base system 14, and a CPE unit 16, respectively.

FIG. 5A is a flow diagram of a method 200 corresponding to the operation of remote terminal 12 during remote origination call processing. Method 200 begins at step 202 where remote terminal 12 receives an incoming call request from central office 18, as represented by arrow 49 in FIG. 4. The incoming call request indicates that a party at a remote telephone coupled to central office 18 desires to make a call to a party at one of telephones 20. In response to the incoming call request, remote terminal 12 generates and sends an alert message to base system 14 at step 204. The alert message is represented by arrow 50 in FIG. 4.

At step 206, remote terminal 12 determines whether a reply has been received from base system 14. A reply may be either an acknowledge alert message or an acknowledge/unavailable message, explained below. If no reply has been received, remote terminal 12 generates and sends an alarm message at step 208. The alarm message functions to alert an appropriate entity, such as a system administrator, that a problem has arisen in LMDS system 10. At step 210, remote terminal 12 increments a number corresponding the number of retries that remote terminal 12 has attempted for the generation and sending of an alert message.

Remote terminal 12 then determines at step 212 whether a maximum number of retries has been exceeded. If not, remote terminal 12 returns to step 204 where it again generates and sends an alert message to base system 14. On the other hand, if the maximum number of retries has been exceeded, remote terminal 12 generates and sends a fail message to central office 18 at step 214. The fail message indicates to central office 18 that the call cannot be delivered at this time. At step 216, remote terminal 12 ceases processing, and method 200 ends.

Referring again to step 206, if it is determined that a reply has been received from base system 14, remote terminal 12 then determines whether the reply is an acknowledge alert message (as indicated by arrow 56 in FIG. 4) at step 218. An acknowledge alert message specifies a frequency and time slot assigned by base system 14 for the telephone call. If the reply is not an acknowledge alert message, the message is a acknowledge/unavailable message which indicates that transmission resources are unavailable for call delivery at the current time. If an acknowledge/unavailable message has been received, remote terminal 12 moves to step 214 where it generates and sends a fail message to central office 18. On the other hand, if an acknowledge alert message has been received, remote terminal 12 determines the assigned frequency and time slot at step 220. Information for the assigned frequency and time slot can be stored as part of information 24 contained in memory 23 of remote terminal 12. At step 222, remote terminal 12 generates and sends an acknowledge message for the acknowledge to base system 14. The acknowledge message for the acknowledge is represented by arrow 58 in FIG. 4.

At step 224, remote terminal 12 performs normal call processing with central office 18, as indicated by arrow 60 in FIG. 4.

FIG. 5B is a flow diagram of a method 230 corresponding to the operation of base system 14 during remote origination call processing. Method 230 begins at step 232 where base system 14 receives an alert message (represented by arrow 50 in FIG. 4) from remote terminal 12. The alert message indicates to base system 14 that it is now desirable to deliver a call from central office 18 to one of telephones 20.

At step 234, base system 14 determines whether a frequency and time slot are available for the call. In one embodiment, a record of available frequencies and time slots is maintained within memory 26. If it is determined that a frequency and time slot are not available, base system 14 generates and sends an acknowledge/unavailable message to remote terminal 12 at step 236. The acknowledge/unavailable message indicates that a frequency and time slot are unavailable for delivery of the call. At step 238, base system 14 ceases processing, and method 230 ends.

On the other hand, if it is determined at step 234 that a frequency and time slot are available, base system 14 assigns a frequency and time slot for the call at step 240. The assigned frequency and time slot may be stored in memory 26 as part of information 29. At step 242, base system 14 generates and sends an alert/assignment message to the appropriate CPE unit 16. The alert/assignment message is represented by arrow 52 in FIG. 4.

At step 244, base system 14 determines whether an acknowledgment (as represented by arrow 56 in FIG. 4) has been received from CPE unit 16. If not, base system 14 increments a number corresponding to the number of retries it has attempted for generating and sending an alert/ assignment message at step 246. At step 248, base system 14 determines whether a maximum number of retries has been exceeded. If not, base system 14 returns to step 242 where it generates and sends another alert/assignment message. On the other hand, if the maximum number of retries has been exceeded, base system 14 generates and sends an alarm message at step 250. The alarm message indicates that a problem has arisen in LMDS system 10. At step 252, base system 14 de-assigns the frequency and time slot previously allocated for the call. At step 254, base system 14 generates and sends a fail message to CPE unit 16. Base system 14 then moves to step 236 where it generates and sends an acknowledge/unavailable message to remote terminal 12.

Referring again to step 244, if it is determined that an acknowledgment has been received from CPE unit 16, base system 14 generates and sends an alert acknowledge message to remote terminal 12 at step 256. The alert acknowledge message, represented by arrow 56 in FIG. 4, may specify the assigned frequency and time slot.

At step 258, base system 14 determines whether an acknowledge for the alert acknowledge message (as represented by arrow 58 in FIG. 4) has been received from remote terminal 12. If so, method 230 ends. Otherwise, at step 260, base system 14 increments a number corresponding to the number of retries it has attempted for the generation and sending of an alert acknowledge message. At step 262, base system 14 determines whether a maximum number of retries has been exceeded. If not, base system returns to step 256 where it again generates and sends an alert acknowledge message to remote terminal 12. On the other hand, if the maximum number of retries has been exceeded, base system 14 generates and sends an alarm message at step 264. The alarm message functions to alerts an appropriate entity (e.g., a system administrator) that a problem has arisen in LMDS system 10.

At step 266, base system 14 de-assigns the previously allocated frequency and time slot. At step 268, base system 10 generates and sends a fail message to CPE unit 16. The fail message indicates to CPE unit 16 that the call cannot be delivered at the current time. At step 270, base system 14 ceases processing, and method 230 ends.

FIG. 5C is a flow diagram of a method 280 corresponding to the operation of a CPE unit 16 during remote origination call processing. Method 280 begins at step 282 where CPE unit 16 receives an alert/assignment message (represented by arrow 52 in FIG. 4) from base system 14. This message alerts CPE unit 16 that LMDS system 10 has received a request to deliver a call to a telephone 20 coupled to the CPE unit 16. The message may also specify the frequency and time slot assigned by base system 14 for the call.

At step 284, CPE unit 16 determines the assigned frequency and time slot. At step 286, CPE unit 16 tunes to the specified frequency. CPE unit 16 then generates and sends an acknowledge message for the alert/assignment at step 288. The acknowledge message, represented by arrow 54 in FIG. 4, indicates that CPE unit 16 is ready to deliver a call to telephone 20. Method 280 then ends.

Figure 6:
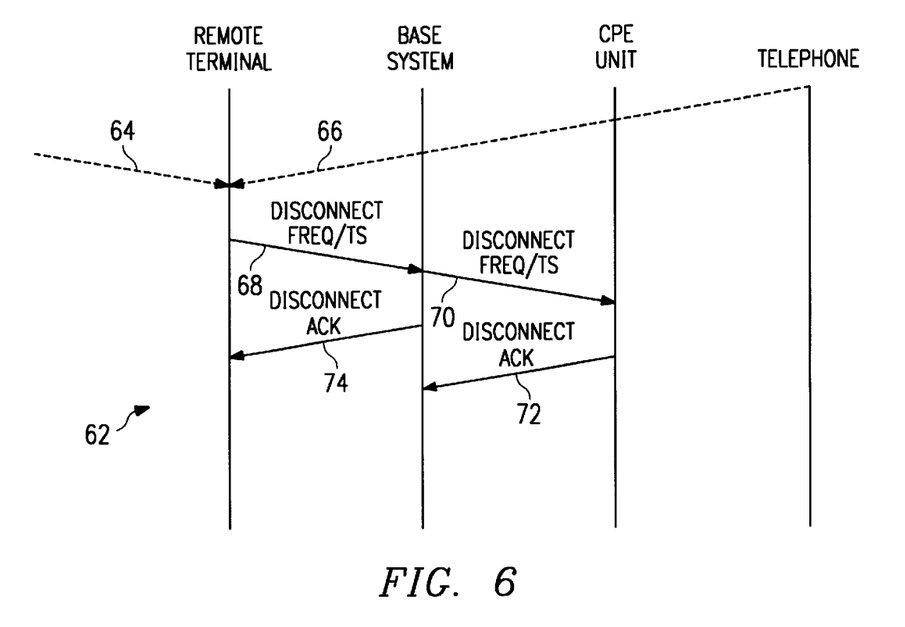
FIG. 6 is a diagram illustrating communication between various elements of the local multipoint distribution services system shown in FIG. 1 during disconnect call processing.

FIGS. 6 and 7A through 7C relate to the operation of LMDS system 10 as it can be used to perform de-allocate a time slot and frequency after a call has been terminated either at the near end (i.e., at a telephone 20) or the far end (i.e., at a remote telephone coupled to central office 18). The process of de-allocation of transmission resources may be integral with, or contained within, disconnect call processing. FIG. 6 illustrates a communication diagram 62 having a plurality of arrows 64 through 72. Each of these arrows 64 through 72 represents transmission of a message or signal between two of remote terminal 12, base system 14, CPE unit 16, central office 18, and telephone 20 during disconnect call processing. Arrows 64 through 72 are explained below in more detail with reference to FIGS. 7A through 7C.

Figure 7A:
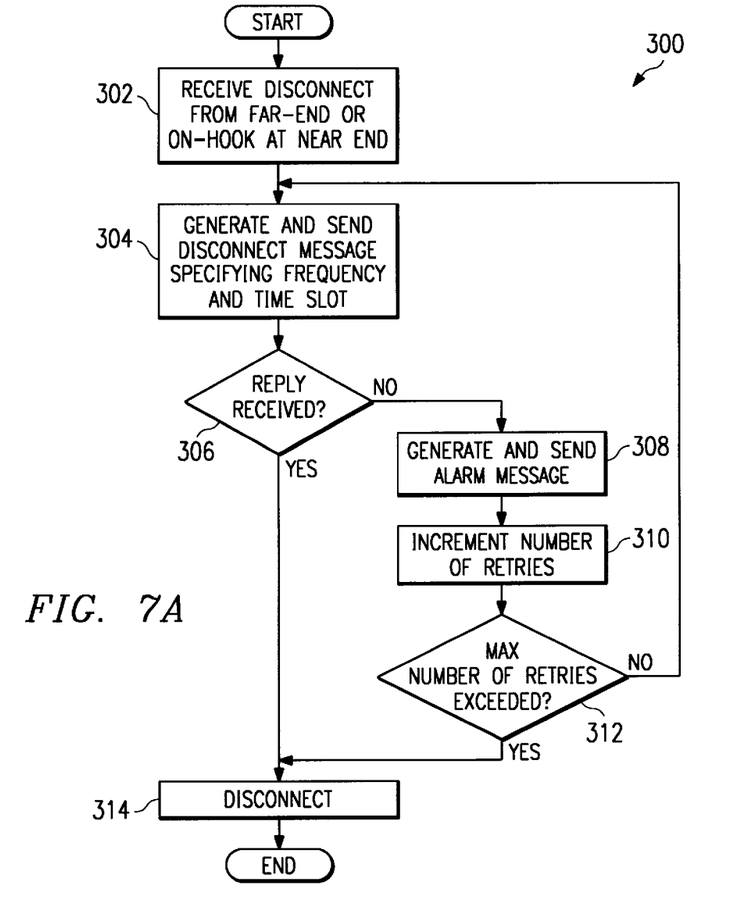
FIGS. 7A through 7C are flow diagrams of related methods for de-allocating transmission resources during disconnect call processing.
Figure 7B:
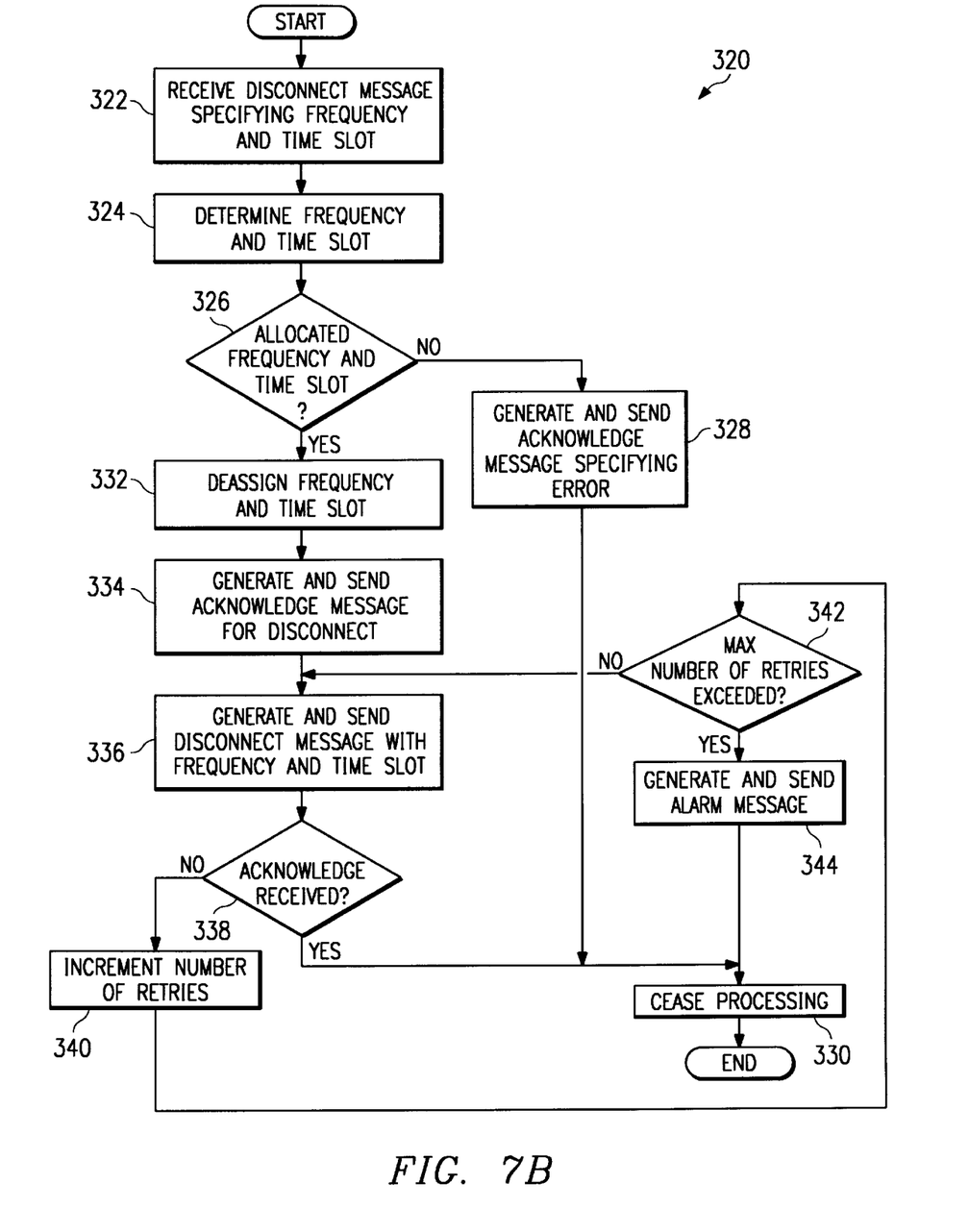
Figure 7C:
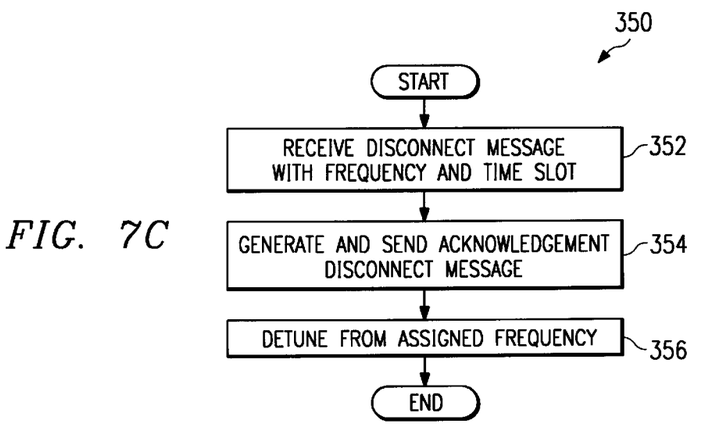

FIGS. 7A through 7C are flow diagrams of a plurality of related methods for de-allocating transmission resources during disconnect call processing. FIGS. 7A, 7B, and 7C correspond to the operation of remote terminal 12, base system 14, and a CPE unit 16, respectively.

FIG. 7A is a flow diagram of a method 300 corresponding to the operation of remote terminal 12 during disconnect call processing. Method 300 begins at step 302 where remote terminal 12 receives a disconnect signal from either the far end (i.e., central office 18) or an on-hook signal from the near end (i.e., a telephone 20). Far end disconnect and near end on-hook signals are represented by arrows 64 and 66, respectively, in FIG. 6. The near end on-hook signal may be contained within the out of bound channel and passed through base system 14 from CPE unit 16. The far end disconnect and near end on-hook signals indicate that the call has been terminated and that transmission resources allocated for the call can be de-allocated so that the resources can be re-used.

At step 304, remote terminal 12 generates and sends a disconnect message specifying the frequency and time slot that was allocated for the call to base system 14. The disconnect message is represented by arrow 68 in FIG. 6. In one embodiment, information for the frequency and time slot would have been previously stored in memory 23 of remote terminal 12. In such an embodiment, this information may be purged from memory when the disconnect message is generated.

At step 306, remote terminal 12 determines whether a reply (represented by arrow 74 in FIG. 6) has been received from base system 14. If no reply has been received, remote terminal 12 generates and sends an alarm message at step 308. The alarm message may alert a system administrator that problems have arisen. At step 310, remote terminal 12 increments a number corresponding to the number of retries that it has attempted for the generation and sending of a disconnect message. At step 312, remote terminal 12 determines whether the maximum number of retries has been exceeded. If not, remote terminal 12 generates and sends another disconnect message to base system 14 at step 304. On the other hand, if the maximum number of retries has been exceeded, remote terminal 12 disconnects at step 314, and method 300 ends.

FIG. 7B is a flow diagram of a method 320 corresponding to the operation of base system 14 during disconnect call processing. Method 320 begins at step 322, where base system 14 receives a disconnect message (represented by arrow 68 in FIG. 6) specifying frequency and time slot from remote terminal 12. Base system 14 determines the frequency and time slot that was allocated for the call to be disconnected at step 324.

At step 326, base system 14 determines whether the frequency and time slot specified by the disconnect message corresponds to one of the frequency and time slots previously allocated. Such information specifying previously allocated frequencies and time slots may be maintained in memory 26 as part of information 29. If the specified frequency and time slot do not correspond to a previously allocated frequency and time slot, then at step 328 base system 14 generates and sends an acknowledge message specifying that an error has occurred. At step 330, base system 14 ceases processing, and method 320 ends.

On the other hand, if the specified frequency and time slot correspond to an allocated frequency and time slot, then base system 14 de-assigns the frequency and time slot at step 332. The information about the assignment may also be purged from memory 26 at this time. At step 334, base system 14 generates and sends an acknowledge message for disconnect to remote terminal 12. The acknowledge message is represented by arrow 74 in FIG. 6.

At step 336, base system 14 generates and sends a disconnect message to CPE unit 16. The disconnect message, represented by arrow 70 in FIG. 6, may specify the frequency and time slot that was previously assigned for the call. At step 338, base system 14 determines whether an acknowledge has been received from CPE unit 16. If an acknowledge has not been received, base system 14 increments a number corresponding to the number of retries attempted for the generation and sending of a disconnect message at step 340.

At step 342, base system 14 determines whether the maximum number of retries has been exceeded. If not, base system 14 returns to step 336 where it generates and sends a disconnect message. On the other hand, if the maximum number of retries has been exceeded, base system 14 generates and sends an alarm at step 344. The alarm alerts an system administrator that problems may have arisen. Base system 14 then proceeds to step 330, where it ceases processing, and method 320 ends.

Referring again to step 338, if it is determined that an acknowledge was received, base system 14 proceeds to step 330 where it ceases processing, and method 320 ends.

FIG. 7C is a flow diagram of a method 350 corresponding to the operation of CPE unit 16 during disconnect call processing. Method 350 begins at step 352 where CPE unit 16 receives a disconnect message (as represented by arrow 70 in FIG. 6) from base system 14. The disconnect message may specify the frequency and time slot previously allocated for the call which it is now desirable to disconnect.

At step 354, CPE unit 16 generates and sends an acknowledge disconnect message to base system 14. The acknowledge disconnect message is represented by arrow 72 in FIG. 6. CPE unit 16 then de-tunes from the assigned frequency at step 356, if no other time slots are assigned for the CPE unit 16 on that frequency. Method 350 ends.

Accordingly, the present invention comprises a protocol by which elements in LMDS system 10 communicate to allocate and de-allocate transmission resources (i.e., time slots and frequencies) to support re-use of these resources.

Although the present invention and its advantages have been described in detail, it should be understood that various changes, substitutions, and alterations can be made therein without departing from the spirit and scope of the present invention as defined by the appended claims.

What is claimed is:

1. A method for allocating and de-allocating transmission resources in a local multipoint distribution services system, the method comprising the steps of:

detecting one of an off-hook after idle signal and an incoming call request signal;

determining at a base system a frequency and a time slot available for a call;

assigning an available frequency and an available time slot to the call at said base system;

tuning a customer premises equipment unit to the assigned frequency in order to deliver the call;

storing information specifying the assigned frequency and time slot at a remote terminal;

detecting a disconnect signal; and purging from the remote terminal the stored information specifying the assigned frequency and time slot in response to the disconnect signal.

2. A local multipoint distribution services system comprising:

a remote terminal operable to detect an incoming call request signal;

a customer premises equipment unit operable to detect an off-hook after idle signal, the customer premises equipment unit further operable to tune to an assigned frequency for a call;

a base system coupled to the remote terminal and the customer premises equipment unit, the base system operable to assign the frequency and a time slot for the call in response to either the detection of an incoming call request signal or an off-hook after idle signal;

the remote terminal is further operable to detect a disconnect signal; and the base system is further operable to de-assign the assigned frequency and the time slot in response to the detection of a disconnect signal.

3. A local multipoint distribution services system comprising:

a remote terminal operable to detect an incoming call request signal;

a customer premises equipment unit operable to detect an off-hook after idle signal, the customer premises equipment unit further operable to tune to an assigned frequency for a call;

a base system coupled to the remote terminal and the customer premises equipment unit, the base system operable to assign the frequency and a time slot for the call in response to either the detection of an incoming call request signal or an off-hook after idle signal;

the remote terminal is further operable to detect a disconnect signal;

the base system is further operable to de-assign the assigned frequency and time slot; and the customer premises equipment unit is further operable to de-tune from the assigned frequency.

4. The system of claim 2 wherein the remote terminal is further operable to store information specifying the assigned frequency and time slot for the call.

5. A local multipoint distribution services system comprising:

a remote terminal operable to detect an incoming call request signal;

a customer premises equipment unit operable to detect an off-hook after idle signal, the customer premises equipment unit further operable to tune to an assigned frequency for a call;

a base system coupled to the remote terminal and the customer premises equipment unit, the base system operable to assign the frequency and a time slot for the call in response to either the detection of an incoming call request signal or an off-hook after idle signal;

the remote terminal further operable to store information specifying the assigned frequency and time slot for the call; and the remote terminal is further operable to detect a disconnect signal, the remote terminal further operable to purge the stored information specifying the assigned frequency and time slot for the call in response to the detection of the disconnect signal.

6. A method for allocating and de-allocating transmission resources in a local multipoint distribution services system comprising the steps of:

detecting an off-hook after idle signal, generating and transmitting a connect/request signal at a customer premises equipment unit to a base system in response to said off-hook after idle signal;

determining frequency and time slot available at the base system;

assigning frequency and time slot for communicating a call at the base system in response to the connect/request signal;

sending the assigned frequency and time slot from the base system to the customer premises equipment unit;

at the customer premises equipment unit, generating and sending an acknowledge message to said base system and tuning to the specified frequency;

generating and sending connect/request message specifying frequency and time slot from said base system to a remote terminal;

determining if an acknowledge of said connect/request message is received at said base system from said remote terminal and, if not, after a number of retries de-assign said frequency and time slot and if acknowledge is received connecting a DS-1 to the remote terminal.

7. The method of claim 6, wherein if an acknowledge assignment is not received at the base system from the customers premises equipment unit, the frequency and time slot is de-assigned and a fail message is generated.

8. The method of claim 6 including the steps of de-allocating transmission resources including the steps of when receiving disconnect from the terminal end or on-hook at customer premises equipment unit, generating and sending disconnect message specifying frequency and time slot from the terminal to the base system;

generating and sending at the base system disconnect message specifying frequency and time slot to said customer premises equipment unit and de-assigning frequency and time slot and sending a reply to said terminal;

receiving at the customer premises equipment unit a disconnect message from the base system and de-tuning from the assigned frequency and sending an acknoweldge disconnect message from the customer premises equipment unit; and determining at the base system whether an acknowledge has been received from the customer premises equipment unit.

9. A method for allocating and de-allocating transmission resources in a local multipoint distribution services system comprising the steps of:

detecting an incoming call request signal at a remote terminal;

sending an alert message to a base system;

determining at the base system if a communication frequency and time slot is available;

assigning a frequency and time slot for a call;

generating and sending an alert/assignment message of assignment of frequency and time slot to said customer premises equipment unit;

determining assigned frequency and time slot and tuning to assigned frequency at the customer premises equipment unit and generating and sending acknowledge at the customer premises equipment unit when receiving alert/assignment message;

generating and sending alert acknowledge message at base system to remote terminal when receiving an acknowledge from said customer premises equipment unit; and generating an acknowledge for acknowledge received at the remote terminal to the base system.

10. The method of claim 9, wherein when an acknowledge is not received from the customer premises equipment retry a given number of times and if there is not an acknowledge after a given number times, generate and send an alarm message and de-assign the frequency and time slot at the base system and generate a fail message.

11. The method of claim 9, including the steps of de-allocating transmission resources including the steps of when receiving disconnect from the terminal end or on-hook at customer premises equipment unit, generating and sending disconnect message specifying frequency and time slot from the terminal to the base system;

generating and sending at the base system disconnect message specifying frequency and time slot to said customer premises equipment unit and de-assigning frequency and time slot and sending a reply to said terminal;

receiving at the customer premises equipment unit a disconnect message from the base system and de-tuning from the assigned frequency and sending an acknoweldge disconnect message from the customer premises equipment unit; and determining at the base system whether an acknowledge has been received from the customer premises equipment unit.

* * * * *